United States Patent
Fitzer et al.

(10) Patent No.: US 11,561,937 B2
(45) Date of Patent: *Jan. 24, 2023

(54) MULTITENANT APPLICATION SERVER USING A UNION FILE SYSTEM

(71) Applicant: SAP SE, Walldorf (DE)

(72) Inventors: Joachim Fitzer, Schriesheim (DE); Pietro Francesco Menna, Sao Leopoldo (BR); Felipe Musse, Porto Alegre (BR); Simon Seif, Ostringen (DE)

(73) Assignee: SAP SE, Walldorf (DE)

( * ) Notice: Subject to any disclaimer, the term of this patent is extended or adjusted under 35 U.S.C. 154(b) by 77 days.

This patent is subject to a terminal disclaimer.

(21) Appl. No.: 17/369,059

(22) Filed: Jul. 7, 2021

(65) Prior Publication Data
US 2021/0334243 A1    Oct. 28, 2021

Related U.S. Application Data

(63) Continuation of application No. 16/376,351, filed on Apr. 5, 2019, now Pat. No. 11,113,249.

(51) Int. Cl.
*G06F 16/00* (2019.01)
*G06F 16/185* (2019.01)
*G06F 16/182* (2019.01)

(52) U.S. Cl.
CPC .......... *G06F 16/185* (2019.01); *G06F 16/183* (2019.01)

(58) Field of Classification Search
None
See application file for complete search history.

(56) References Cited

U.S. PATENT DOCUMENTS

| | | |
|---|---|---|
| 6,356,915 B1 | 3/2002 | Chtchetkine et al. |
| 7,620,948 B1 | 11/2009 | Rowe et al. |
| 7,636,722 B2 | 12/2009 | Bunker et al. |
| 7,769,794 B2 | 8/2010 | Moore et al. |
| 9,766,881 B2 * | 9/2017 | Wong ........................ G06F 8/70 |
| 10,169,347 B2 | 1/2019 | Jayachandran et al. |
| 10,809,994 B1 | 10/2020 | Fitzer et al. |
| 10,866,938 B2 * | 12/2020 | Gupta ................. G06F 21/6218 |

(Continued)

OTHER PUBLICATIONS

"U.S. Appl. No. 16/376,277, Non Final Office Action dated Jun. 3, 2021", 14 pgs.

(Continued)

*Primary Examiner* — Hasanul Mobin
(74) *Attorney, Agent, or Firm* — Schwegman Lundberg & Woessner, P.A.

(57) ABSTRACT

Example methods and systems are directed to a multitenant application server using a union file system. Each tenant has one or more users and a tenant layer in the union file system. Each user has a user layer in the union file system. The union file system provides a logical file system to each user based on the user layer, the tenant layer, and a base layer comprising a set of application layers. A first user shares an application template file with other users of the same tenant by moving the file from the first user's user layer to the tenant layer. After the file is moved, all users of the tenant have access to the application defined by the application template file. The moving of the file is achieved by modifying metadata for the file.

20 Claims, 9 Drawing Sheets

(56) References Cited

U.S. PATENT DOCUMENTS

| | | | |
|---|---|---|---|
| 10,942,723 B2 | 3/2021 | Fitzer et al. | |
| 10,956,140 B2 | 3/2021 | Fitzer et al. | |
| 2004/0064589 A1* | 4/2004 | Boucher | H04L 69/12 |
| | | | 709/250 |
| 2004/0064590 A1* | 4/2004 | Starr | H04L 67/1097 |
| | | | 709/250 |
| 2004/0189707 A1 | 9/2004 | Moore et al. | |
| 2004/0193594 A1 | 9/2004 | Moore et al. | |
| 2004/0193621 A1 | 9/2004 | Moore et al. | |
| 2004/0193672 A1 | 9/2004 | Samji et al. | |
| 2004/0193673 A1 | 9/2004 | Samji et al. | |
| 2004/0204941 A1* | 10/2004 | Israch | G10L 15/30 |
| | | | 704/240 |
| 2004/0230599 A1 | 11/2004 | Moore et al. | |
| 2005/0246331 A1 | 11/2005 | De Vorchik et al. | |
| 2006/0036568 A1 | 2/2006 | Moore et al. | |
| 2007/0067349 A1 | 3/2007 | Jhaveri et al. | |
| 2007/0067497 A1* | 3/2007 | Craft | H04L 69/32 |
| | | | 709/250 |
| 2007/0245257 A1 | 10/2007 | Chan et al. | |
| 2009/0157627 A1 | 6/2009 | Arthursson | |
| 2009/0305778 A1 | 12/2009 | Yu et al. | |
| 2011/0119634 A1 | 5/2011 | Bhatt et al. | |
| 2012/0011562 A1 | 1/2012 | Slater et al. | |
| 2012/0047139 A1 | 2/2012 | Fitzer et al. | |
| 2012/0110328 A1* | 5/2012 | Pate | H04L 63/062 |
| | | | 713/165 |
| 2012/0166488 A1* | 6/2012 | Kaushik | G06F 21/6209 |
| | | | 707/795 |
| 2012/0198559 A1 | 8/2012 | Venkata | |
| 2014/0074782 A1* | 3/2014 | Green | G06F 3/064 |
| | | | 707/620 |
| 2014/0248002 A1 | 9/2014 | Thakkar et al. | |
| 2015/0128105 A1 | 5/2015 | Sethi et al. | |
| 2015/0261774 A1 | 9/2015 | Mcferrin et al. | |
| 2015/0261782 A1 | 9/2015 | Mcferrin et al. | |
| 2015/0261971 A1 | 9/2015 | Mcferrin et al. | |
| 2015/0268948 A1 | 9/2015 | Plate | |
| 2016/0261684 A1* | 9/2016 | Khalaf | G06F 9/45558 |
| 2016/0378348 A1 | 12/2016 | Uriel | |
| 2016/0378676 A1 | 12/2016 | Uriel | |
| 2017/0048079 A1 | 2/2017 | Nethi et al. | |
| 2017/0075675 A1 | 3/2017 | Babol et al. | |
| 2017/0078094 A1* | 3/2017 | Olson | H04L 9/0825 |
| 2017/0206071 A1 | 7/2017 | Kirkpatrick | |
| 2017/0344292 A1 | 11/2017 | Sterin et al. | |
| 2017/0364342 A1 | 12/2017 | Shuster et al. | |
| 2018/0027006 A1 | 1/2018 | Zimmermann et al. | |
| 2018/0027070 A1 | 1/2018 | Jhanji et al. | |
| 2018/0129479 A1 | 5/2018 | Mcpherson et al. | |
| 2018/0129803 A1 | 5/2018 | Levin et al. | |
| 2018/0189121 A1 | 7/2018 | Jobi et al. | |
| 2018/0196654 A1 | 7/2018 | Bo et al. | |
| 2018/0211029 A1 | 7/2018 | Ryu et al. | |
| 2018/0293066 A1 | 10/2018 | Ali et al. | |
| 2018/0295059 A1 | 10/2018 | Gamage | |
| 2018/0341471 A1 | 11/2018 | Stefanov et al. | |
| 2018/0351870 A1 | 12/2018 | Chen et al. | |
| 2018/0356964 A1 | 12/2018 | Morris | |
| 2018/0357068 A1 | 12/2018 | Ambichl et al. | |
| 2019/0004779 A1 | 1/2019 | Schmidt et al. | |
| 2019/0026474 A1 | 1/2019 | Adam et al. | |
| 2019/0042286 A1 | 2/2019 | Bailey et al. | |
| 2019/0095179 A1 | 3/2019 | Straub | |
| 2019/0146830 A1* | 5/2019 | Gerber | G06N 20/00 |
| | | | 718/101 |
| 2019/0173949 A1 | 6/2019 | Inomata et al. | |
| 2019/0205289 A1 | 7/2019 | Kleinpeter et al. | |
| 2019/0227794 A1 | 7/2019 | Mercille et al. | |
| 2019/0235900 A1 | 8/2019 | Singh et al. | |
| 2019/0272224 A1 | 9/2019 | Woods | |
| 2019/0324786 A1 | 10/2019 | Ranjan et al. | |
| 2019/0349402 A1 | 11/2019 | Shukla et al. | |
| 2020/0001941 A1 | 1/2020 | Dima et al. | |
| 2020/0034170 A1* | 1/2020 | Chen | G06F 16/1734 |
| 2020/0034745 A1 | 1/2020 | Nagpal et al. | |
| 2020/0104385 A1 | 4/2020 | Zheng et al. | |
| 2020/0319869 A1 | 10/2020 | Fitzer et al. | |
| 2020/0319870 A1 | 10/2020 | Fitzer et al. | |
| 2020/0319871 A1 | 10/2020 | Fitzer et al. | |
| 2020/0320041 A1 | 10/2020 | Fitzer et al. | |
| 2020/0320042 A1 | 10/2020 | Fitzer et al. | |
| 2021/0149657 A1 | 5/2021 | Fitzer et al. | |

OTHER PUBLICATIONS

"U.S. Appl. No. 16/376,305, Examiner Interview Summary dated Jun. 4, 2020", 3 pgs.

"U.S. Appl. No. 16/376,305, Non Final Office Action dated Feb. 21, 2020".

"U.S. Appl. No. 16/376,305, Notice of Allowance dated Jun. 30, 2020", 7 pgs.

"U.S. Appl. No. 16/376,305, Notice of Allowance dated Nov. 24, 2020", 8 pgs.

"U.S. Appl. No. 16/376,305, Response filed Apr. 24, 2020 to Non Final Office Action dated Feb. 21, 2020", 10 pgs.

"U.S. Appl. No. 16/376,351, Examiner Interview Summary dated May 26, 2021", 2 pgs.

"U.S. Appl. No. 16/376,351, Non Final Office Action dated Mar. 29, 2021", 10 pgs.

"U.S. Appl. No. 16/376,351, Notice of Allowance dated Jun. 16, 2021", 8 pgs.

"U.S. Appl. No. 16/376,351, Response filed Jun. 1, 2021 to Non Final Office Action dated Mar. 29, 2021", 12 pgs.

"U.S. Appl. No. 16/376,408, Examiner Interview Summary dated Jun. 2, 2020", 4 pgs.

"U.S. Appl. No. 16/376,408, Non Final Office Action dated Apr. 29, 2020", 12 pgs.

"U.S. Appl. No. 16/376,408, Notice of Allowance dated Aug. 3, 2020".

"U.S. Appl. No. 16/376,408, Response filed May 28, 2020 to Non Final Office Action dated Apr. 29, 2020", 11 pgs.

"U.S. Appl. No. 16/376,453, Corrected Notice of Allowability dated Dec. 8, 2020", 8 pgs.

"U.S. Appl. No. 16/376,453, Examiner Interview Summary dated Jun. 2, 2020", 3 pgs.

"U.S. Appl. No. 16/376,453, Examiner Interview Summary dated Oct. 6, 2020", 3 pgs.

"U.S. Appl. No. 16/376,453, Final Office Action dated Aug. 31, 2020", 19 pgs.

"U.S. Appl. No. 16/376,453, Non Final Office Action dated Apr. 30, 2020", 16 pgs.

"U.S. Appl. No. 16/376,453, Notice of Allowance dated Oct. 28, 2020", 11 pgs.

"U.S. Appl. No. 16/376,453, Response filed May 27, 2020 to Non Final Office Action dated Apr. 30, 2020", 9 pgs.

"U.S. Appl. No. 16/376,453, Response filed Oct. 6, 2020 to Final Office Action dated Aug. 31, 2020", 8 pgs.

Brown, Nigel, "The Overlay File System", [Online]. Retrieved from the Internet: <URL: https://windsock.io/the-overlay-filesystem/>, (May 22, 2015), 5 pgs.

Heiner, Andreas P., et al., "Secure Software Installation in a Mobile Environment", (Jul. 18-20, 2007), pp. 155-156.

Venkatesh, Sunil, "Dynamically reconfigurable layered filesystem (thesis)", University of Maryland, Baltimore County, (2012), 59 pgs.

* cited by examiner

USER TABLE (305)

| USER ID | TENANT ID |
|---|---|
| 1 | 1 |
| 2 | 1 |
| 3 | 1 |
| 4 | 2 |

TENANT TABLE (320)

| TENANT ID | BASE LAYER ID |
|---|---|
| 1 | 1 |
| 2 | 2 |
| 3 | 3 |
| 4 | 4 |

BASE LAYER TABLE (335)

| BASE LAYER ID | LAYER ID | LAYER ORDER |
|---|---|---|
| 1 | 1 | 1 |
| 1 | 2 | 2 |
| 2 | 2 | 1 |
| 2 | 3 | 2 |

TEMPLATE TABLE (350)

| LAYER ID | TEMPLATE FILENAME |
|---|---|
| U1 | /APPLICATION_TEMPLATES/TEMPLATE1 |
| T1 | /APPLICATION_TEMPLATES/TEMPLATE2 |
| U4 | /APPLICATION_TEMPLATES/TEMPLATE3 |

*FIG. 3*

MULTITENANT APPLICATION SERVER USING A UNION FILE SYSTEM

CROSS-REFERENCE TO RELATED APPLICATIONS

This application is a continuation of prior application Ser. No. 16/376,351, filed on Apr. 5, 2019, which is incorporated by reference herein in its entirety.

TECHNICAL FIELD

The subject matter disclosed herein generally relates to union file systems. Specifically, the present disclosure addresses systems and methods to implement a multitenant application server using a union file system.

BACKGROUND

A union file system provides a logical file system that merges two or more physical file systems. Any files that are present in exactly one of the merged file systems are presented unchanged in the resulting logical file system. For files that are presented in more than one of the merged file systems, one of the files is selected by the union file system to be presented in the logical file system.

Applications are defined by application template files. A user that creates an application template file has access to the application. The application template file is duplicated for additional users to provide the application to the additional users.

Multitenancy is a software architecture in which multiple instances of a software application operate in a shared environment. The instances are logically separated.

BRIEF DESCRIPTION OF THE DRAWINGS

Some embodiments are illustrated by way of example and not limitation in the figures of the accompanying drawings.

FIG. 3 is a block diagram of a database schema suitable for use in implementing a multitenant application server using a union file system, according to some example embodiments.

DETAILED DESCRIPTION

Example methods and systems are directed to a multitenant application server using a union file system. Each tenant has one or more users and a tenant layer in the union file system. Each user has a user layer in the union file system. The union file system provides a logical file system to each user based on the user layer, the tenant layer, and a base layer comprising a set of application layers.

A first user shares an application template file with other users of the same tenant by moving the file from the first user's user layer to the tenant layer. After the file is moved, all users of the tenant have access to the application defined by the application template file. The moving of the file is achieved by modifying metadata for the file.

By comparison with existing methods of sharing application template files among users of a single tenant, the methods and systems discussed herein improve efficiency by avoiding copying of data. Updating the metadata for a file is a faster operation than copying the file from a user area to a tenant area. Accordingly, the performance of the application server is improved. Furthermore, processor cycles involved in file copying are saved. Furthermore, by comparison with prior art solutions in which files are shared by duplication (e.g., by placing the files in multiple user areas instead of in a single tenant area), storage resources are saved.

Figure 1:
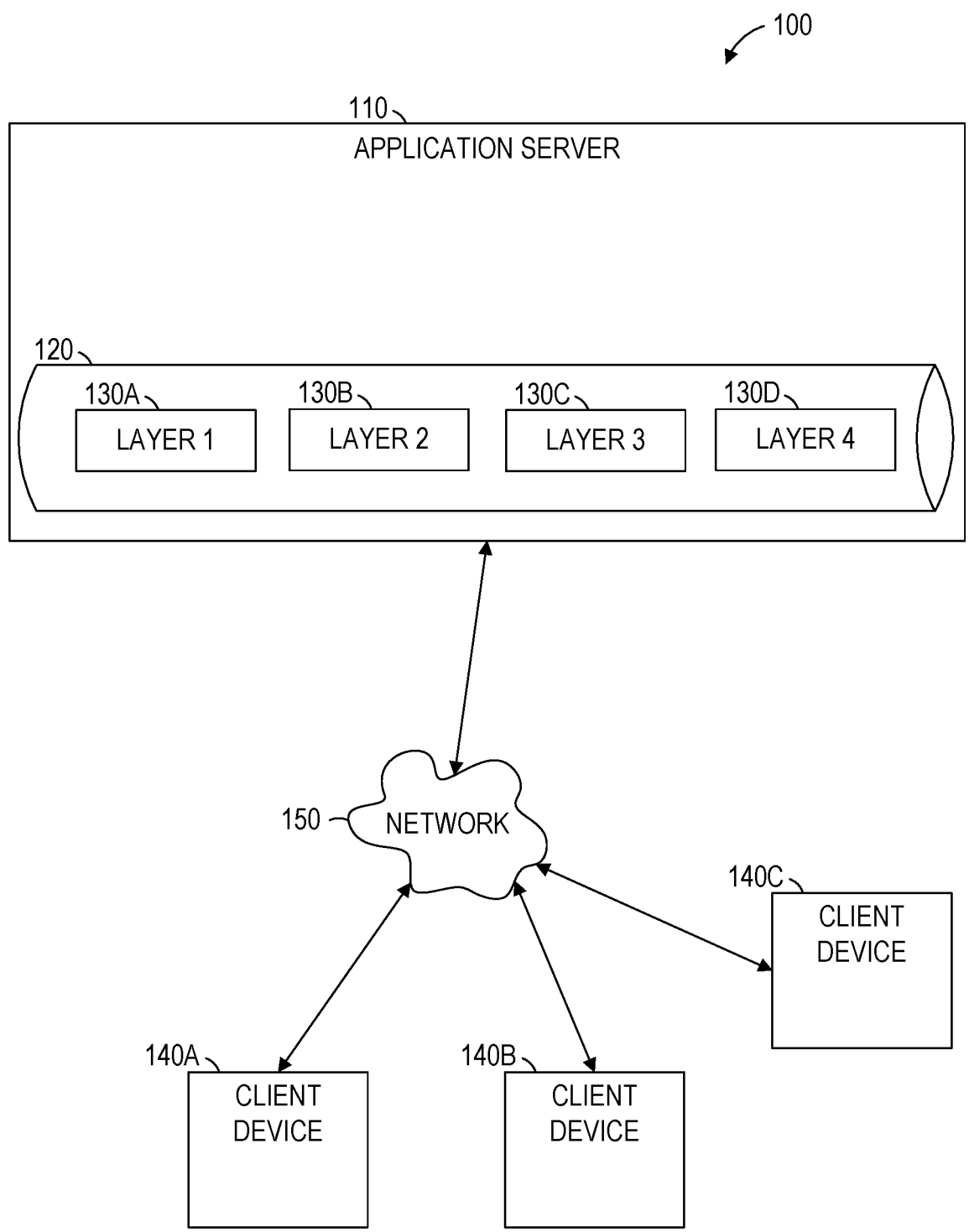
FIG. 1 is a network diagram illustrating a network environment suitable for a multitenant application server using a union file system, according to some example embodiments.

FIG. 1 is a network diagram illustrating a network environment 100 suitable for a multitenant application server using a union file system, according to some example embodiments. The network environment 100 includes an application server 110, client devices 140A, 140B, and 140C, and a network 150. The application server 110 accesses layers 130A, 130B, 130C, and 130D of a union file system stored on a storage device 120 to provide data access to logical file systems to the client devices 140A-140C. The application server 110 and the client devices 140A, 140B, and 140C may each be implemented in a computer system, in whole or in part, as described below with respect to FIG. 9. The client devices 140A, 140B, and 140C may be referred to collectively as client devices 140 or generically as a client device 140.

The client device 140 may provide identifying information to the application server 110, and the identifying information may be used by the application server 110 to determine how to interpret which of the layers 130A-130C to combine in providing a logical file system to the client device.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 110 and the client devices 140A-140C are connected by the network 150. The network 150 may be any network that enables communication between or among machines, databases, and devices. Accordingly, the network 150 may be a wired network, a wireless network (e.g., a mobile or cellular network), or any suitable combination thereof. The network 150 may include one or more portions that constitute a private network, a public network (e.g., the Internet), or any suitable combination thereof. The storage device 120 may be implemented as a solid-state drive (SSD), a hard drive, a network storage device, a redundant array of inexpensive disks (RAID), cloud storage, or any other storage device suitable for storing layers of a union file system.

Figure 2:
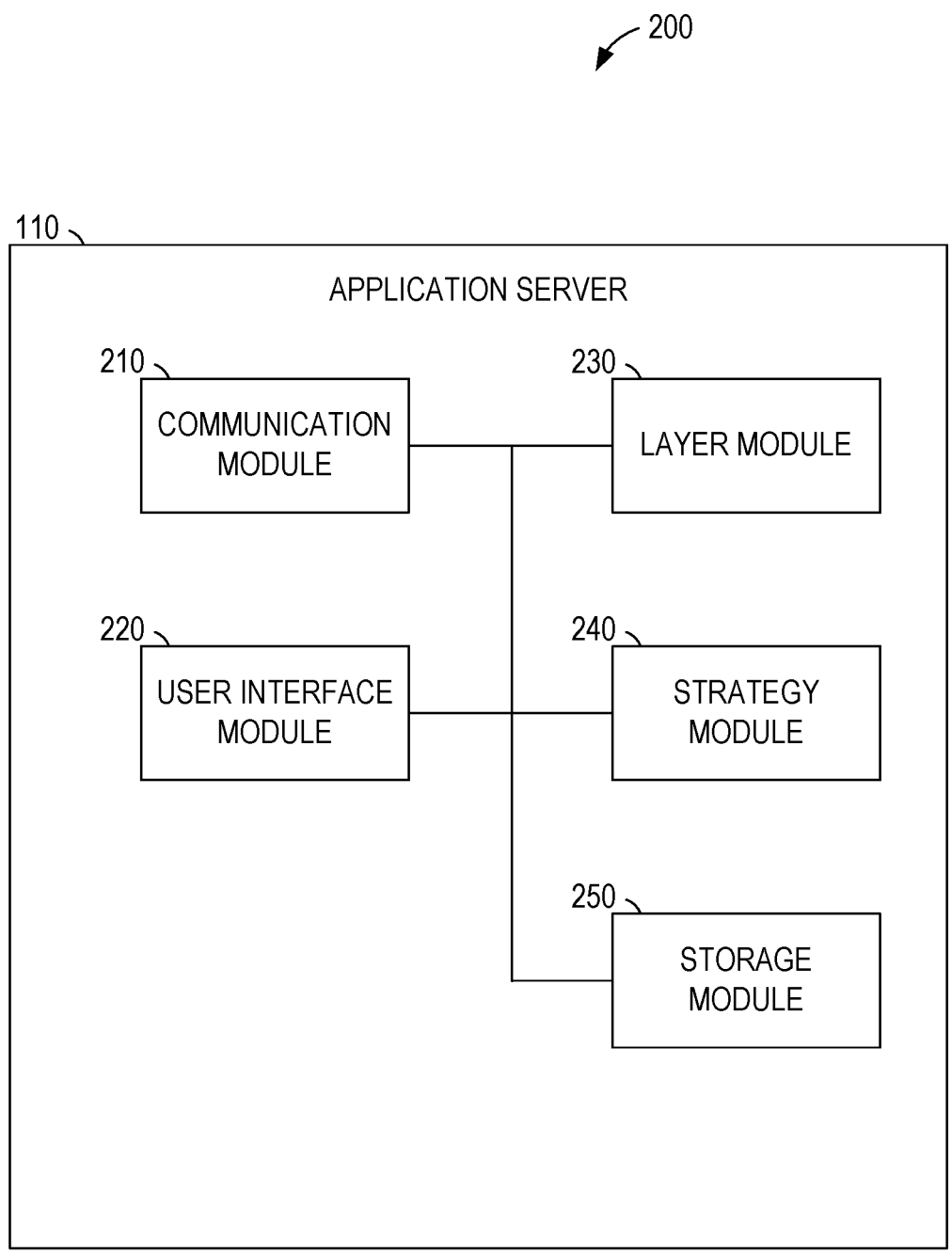
FIG. 2 is a block diagram of an application server, according to some example embodiments, suitable for multitenancy using a union file system.

FIG. 2 is a block diagram 200 of an application server 110, according to some example embodiments, suitable for multitenancy using a union file system. The application server 110 is shown as including a communication module 210, a user interface module 220, a layer module 230, a strategy module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the application server 110 and transmits data from the application server 110. For example, the communication module 210 may receive, from the client device 140A, a request for access to an application stored on a layer of a union file system. The communication module 210 provides the request to the strategy module 240. The strategy module 240, in conjunction with the layer module 230, updates a strategy for the client device 140A to include the layer of the application and any layers containing dependencies of the application. Communications sent and received by the communication module 210 may be intermediated by the network 150.

The user interface module 220 causes presentation of a user interface for the application server 110 on a display associated with the client device 140A, 140B, or 140C. The user interface allows a user to select an application from a list of applications, to interact with an application, or any suitable combination thereof.

FIG. 3 is a block diagram of a database schema 300 suitable for use in implementing a multitenant application server using a union file system, according to some example embodiments. The database schema 300 includes a user table 305, a tenant table 320, a base layer table 335, and a template table 350. The user table 305 includes rows 315A, 315B, 315C, and 315D of a format 310. The tenant table 320 includes rows 330A, 330B, 330C, and 330D of a format 325. The base layer table 335 includes rows 345A, 345B, 345C, and 345D of a format 340. The template table 350 includes rows 360A, 360B, and 360C of a format 355.

Each of the rows 315A-315D of the user table 305 includes a user identifier and a tenant identifier. The user identifier is a unique identifier of the user. The tenant identifier identifies the tenant of the user (e.g., the business entity that is a customer of the business providing the application server 110). One tenant may have many users, but each user has only one tenant. Using the union file system, each user will see a file system comprising files from a user layer, a tenant layer, and a base layer. Each of these three layers may be composed of one or more underlying layers.

Each of the rows 330A-330D of the tenant table 320 includes a tenant identifier and a base layer identifier. One base layer may be used for many tenants, but each tenant has only one base layer. The base layer identifier identifies the base layer to be used by the union file system for the tenant and its users. Thus, users 1, 2, and 3, of the rows 315A-315C will see a logical file system composed of base layer 1 and the tenant layer for tenant 1. Additionally, the logical file system for each user will include the user layer for the user.

The underlying layers used in the base layers are identified in the rows 345A-345D of the base layer table 335. Each row includes a base layer identifier, a layer identifier, and a layer order. The rows 345A and 345B together indicate that, for base layer 1, layer 1 is the top layer and layer 2 is a lower layer. The rows 345C and 345D together indicate that, for base layer 2, layer 2 is the top layer and layer 3 is a lower later.

The template table 350 identifies application template files and the layer corresponding to the application template file. A user or administrator modifies the layer identifier of an application template to modify accessibility of the application template. The union file system determines which users can access each template based on the user identifier, tenant identifier, and base layer identifier for the user and the layer identifier of the template. Thus, the application template of the row 360A, stored on layer "U1" is accessible to user 1 (of the row 315A), but not to any other user. The application template of the row 360B, stored on layer "T1" is accessible to users 1, 2, and 3 (of the rows 315A-315C) that belong to tenant 1, but not to users of other tenants.

Figure 4:
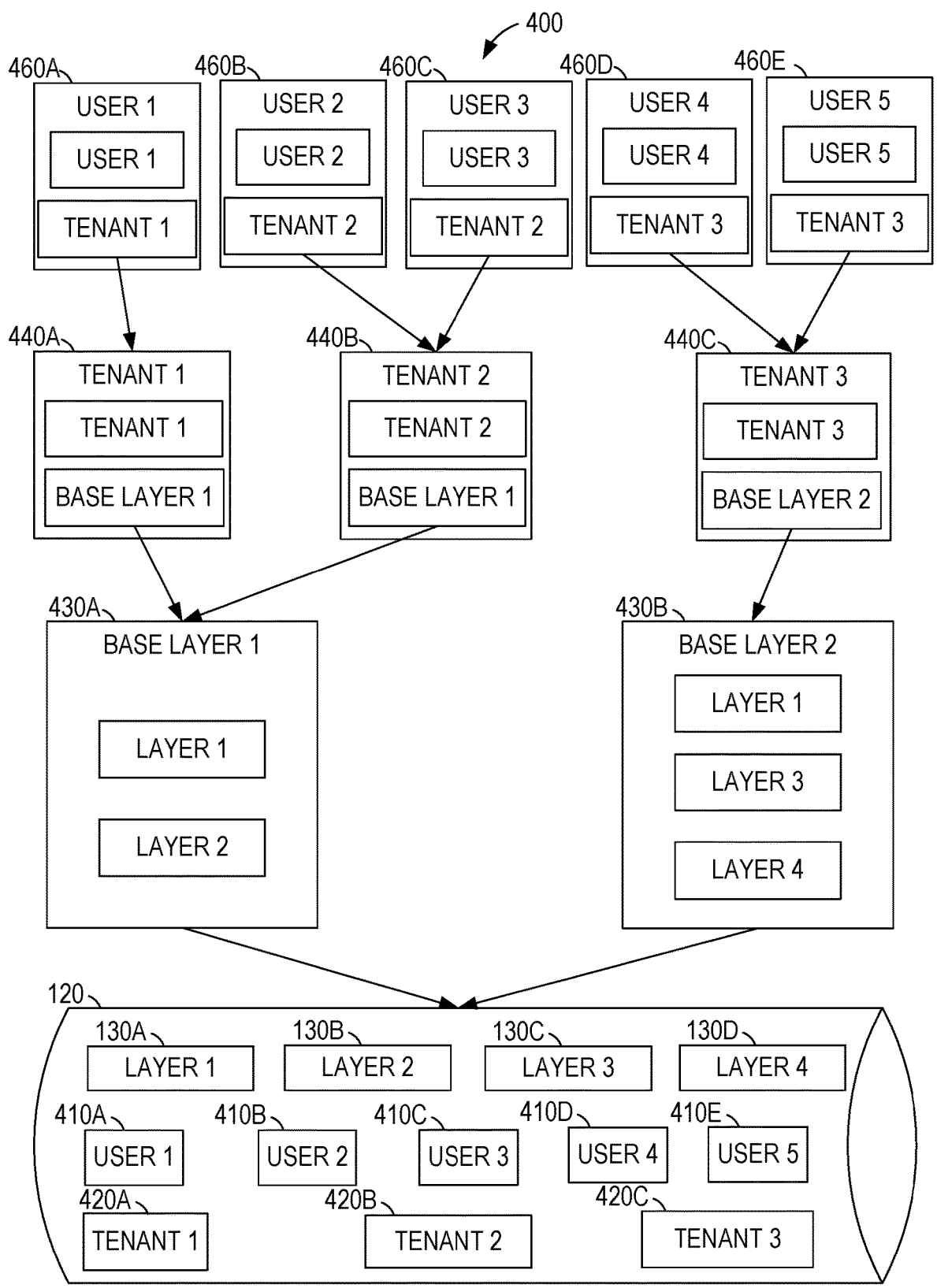
FIG. 4 is an illustration of a union file system with multiple users, tenants, and base layers for accessing layers in implementing a multitenant application server using a union file system, according to some example embodiments.

FIG. 4 is an illustration 400 of a union file system with multiple users, tenants, and base layers for accessing layers in implementing a multitenant application server, according to some example embodiments. The storage device 120 contains layers 130A-130D; user layers 410A, 410B, 410C, 410D, and 410E; and tenant layers 420A, 420B, and 420C. The layers are used by a union file system to create logical file systems 460A, 460B, 460C, 460D, and 460E for users. As intermediate steps in creating the logical file systems 460A-460E, the union file system creates logical file systems 440A, 440B, and 440C for tenants and base layers 430A and 430B.

The base layer 430A includes references to the layers 130A and 130B. Using the base layer 430A, the union file system creates a logical file system to provide access to the files of the layers 130A and 130B without duplicating the stored data of the layers 130A-130B. Similarly, the base layer 430B includes references to the layers 130A, 130B, and 130D. The union file system creates a logical file system using the base layer 430B to provide access to the files of the layers 130A, 130B, and 130D without duplicating the stored data of those application layers.

In this simple illustrative example, the gain from providing a union file system instead of a standard file system for the base layers 430A-430B amounts only to the saving of a duplication of layers 130A and 130B. In a more complex system, any number of layers may be stored in the storage device 120, and any number of base layers, representing any number of combinations of application layers, may be used. Regardless of the number of base layers and the number of different logical file systems created from the different combinations of layers, each application layer is only physically stored once in the storage device 120.

The logical file system 440A comprises the tenant layer 420A merged with the base layer 430A. The logical file system 440B comprises the tenant layer 420B merged with the base layer 430A. Thus, the logical file systems for two different tenants share the same base layer but differ by using distinct tenant layers. The logical file system 440C comprises the tenant layer 420C merged with the base layer 430B.

The logical file systems for the users build on the logical file systems for the tenants. Each of the logical file systems 460A-460E comprises one of the user layers 410A-410E merged with one of the logical file systems 440A-440C for the tenant of the user. Thus, the logical file systems for two different users of the same tenant share the same base layer and the same tenant layer but differ by using distinct user layers. Accordingly, files stored on one of the user layers 410A-410E are unavailable to any user, whether of the same tenant or a different tenant, other than the user of the corresponding one of the logical file systems 460A-460E.

Access permissions are set to ensure that actions of one tenant cannot affect any other tenant. Thus, excluding administrator users of the application server 110, no user has write access to the layers 130A-130D, referenced by the base layers 430A-430B. By contrast to the read-only access to the layers 130A-130D and 430A-430B provided to the users, each user has read-write access to the corresponding user layer (e.g., one of the user layers 410A-410E). An administrator user of each tenant determines which users have write permissions to the tenant layer and which have read-only access.

Since the logical file system for each user is created using the tenant layer for the user's tenant and not the tenant layer of any other tenant, files stored on the tenant layers of other tenants are unavailable to each user. Accordingly, despite the fact that files for multiple tenants are stored in the same storage device 120, the intervention of the union file system ensures that data access is controlled.

Figure 5:
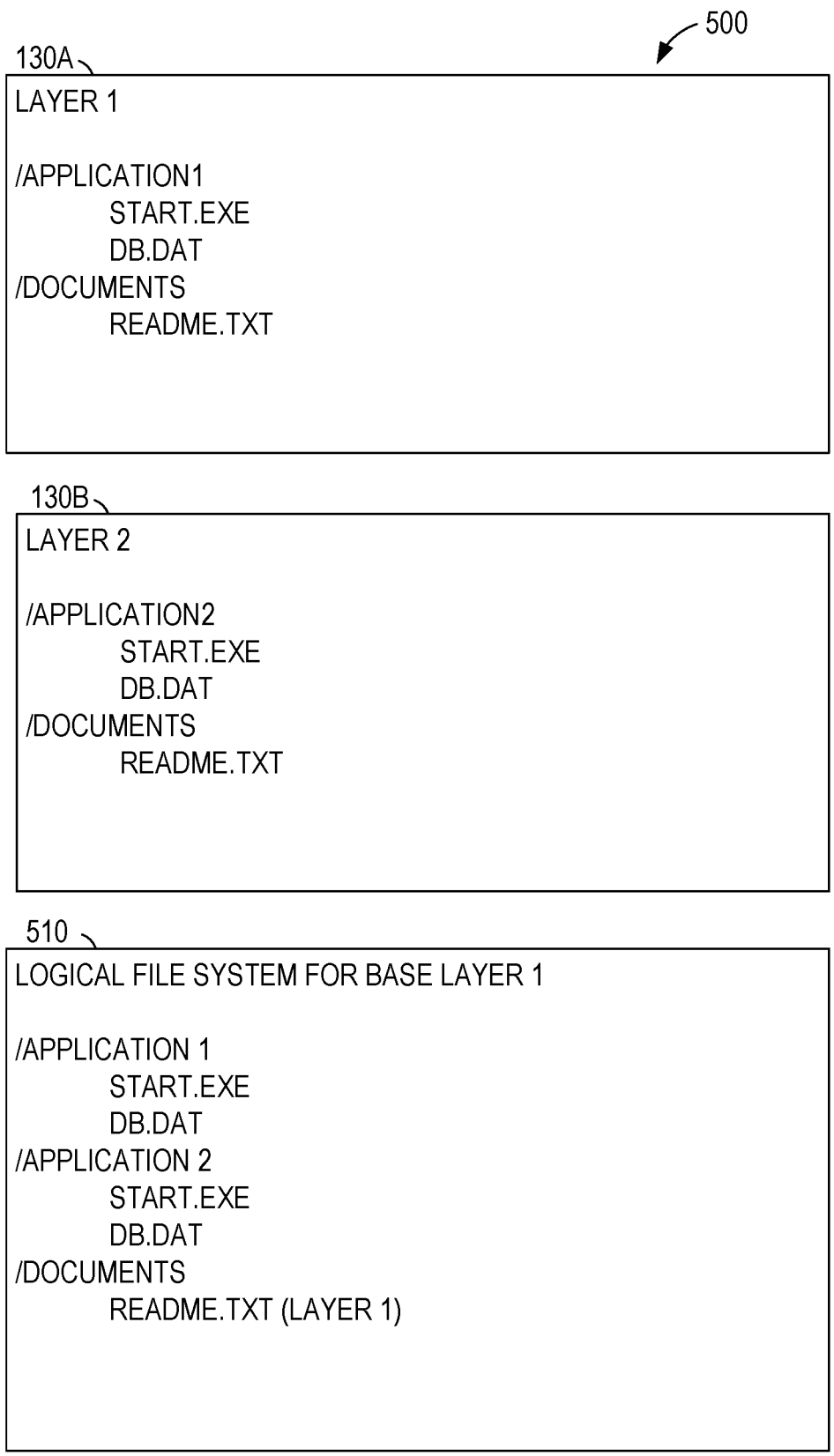
FIG. 5 is an illustration with additional details of a base layer of FIG. 4, according to some example embodiments.

FIG. 5 is an illustration 500 with additional details of the base layer 430A of FIG. 4, according to some example embodiments. Details of the layer 130A are shown, including three files stored in two directories. Details of the layer 130B are also shown, also including three files stored in two directories. Both layers 130A and 130B include a /DOCUMENTS/README.TXT file. The logical file system 510 includes five files in three directories: the four distinct files from the two layers plus one copy of the /DOCUMENTS/README.TXT file. As shown in FIG. 4, the layer 130B is below the layer 130A in the base layer 430A. Accordingly, the conflict is resolved in favor of the higher layer and the README.TXT file present in the logical file system 510 is the file of the layer 130A.

Figure 6:
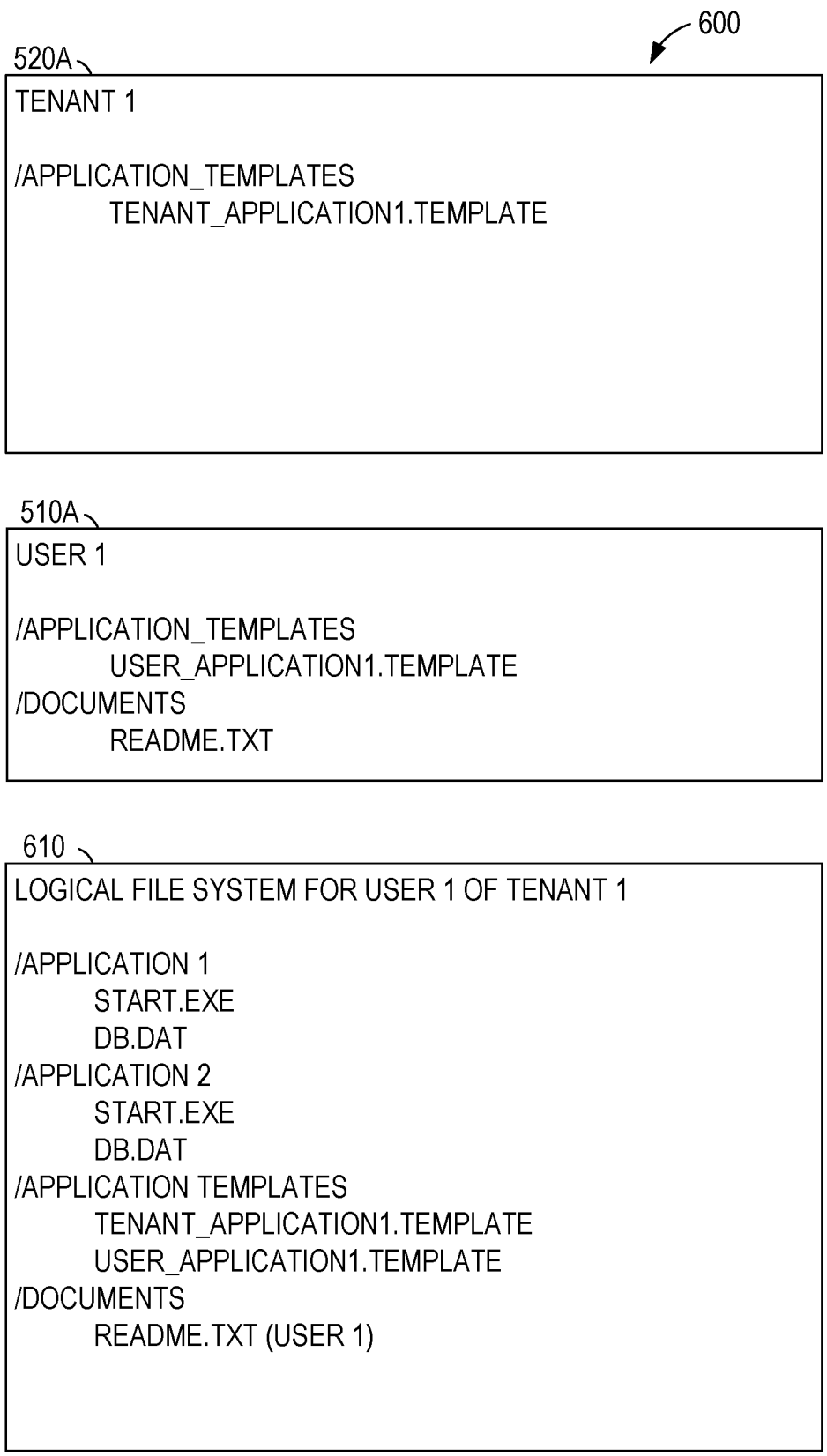
FIG. 6 is an illustration with additional details of a logical file system for a user of FIG. 4, according to some example embodiments.

FIG. 6 is an illustration 600 with additional details of a logical file system for a user of FIG. 4, according to some example embodiments. Details of the tenant layer 520A are shown, including one application template file stored in a directory. Details of the user layer 510A are also shown, also including an application template file stored in the same directory. The logical file system 610 includes the files from the base layer 430A, the file from the tenant layer 520A, and the file from the user layer 510A. The layer 510A includes a /DOCUMENTS/README.TXT file that conflicts with the file of the same name in the base layer 430A. As shown in FIG. 4, the user layer is the topmost layer in the logical file system for a user. Accordingly, the logical file system 610 includes the version of the README.TXT file from the user layer 510A.

Figure 7:
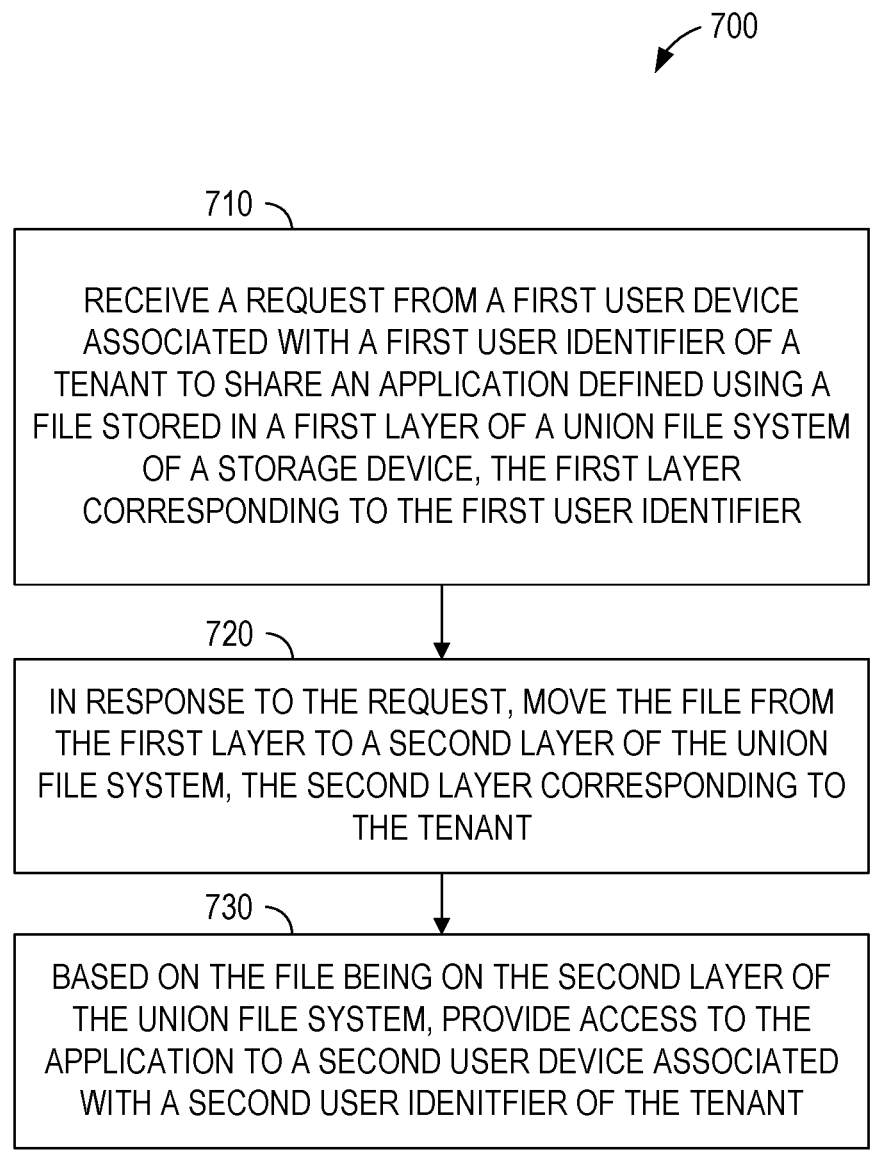
FIG. 7 is a flowchart illustrating operations of a method suitable for manipulating a tenant layer of a union file system, according to some example embodiments, according to some example embodiments.

FIG. 7 is a flowchart illustrating operations of a method 700 suitable for manipulating a tenant layer of a union file system, according to some example embodiments, according to some example embodiments. The method 700 includes operations 710, 720, and 730. By way of example and not limitation, the method 700 is described as being performed by the devices, modules, and databases of FIGS. 1-6.

In operation 710, the layer module 230 receives, from a first user device associated with a first user identifier of a tenant, a request to share an application defined using a file stored in a first layer of a union file system, the first layer corresponding to the first user. As an example, a user logs into the device 140A using credentials corresponding to the user identifier 2, of the row 315B of the user table 305. By logging into the device, the device becomes associated with the user identifier corresponding to the credentials. The layer corresponding to the user identifier associated with the device 140A is the user layer 410B. A request is submitted from the device 140A and via the network 150, to share an application defined by a template file stored on the layer 410B, which is a layer of a union file system of the storage device 120.

In response to the first request, as shown in operation 720, the layer module 230 moves the file from the first layer to a second layer of the union file system, the second layer corresponding to the tenant. For example, the application template file is moved from the user layer 510B to the tenant layer 520B. In some example embodiments, moving the template file is accomplished by updating the layer identifier for the file in the template table 350. Thus, moving the file from one layer to another may be accomplished without copying the data of the file.

In some example embodiments, the application server 110 determines which applications are available to a user device associated with a user identifier by accessing a corresponding set of application template files in a directory (e.g., the /APPLICATION_TEMPLATES directory as shown in FIG. 6). In these example embodiments, the moving of the file from the first layer to the second layer in operation 720 comprises moving the file to the directory on the second layer.

The strategy module 240, based on the file being on the second layer of the union file system, provides access to the application to a second user device associated with a second user identifier of the tenant (operation 730). As an example, a user logs into the device 140B using credentials corresponding to the user identifier 3, of the row 315C of the user table 305. Continuing with this example, the logical file systems 460B and 460C of FIG. 4 both have access to applications defined by template files stored on tenant layer 420B. By moving the application template file from the user layer 410B to the tenant layer 420B, the union file system generates logical file systems that include access to the application for all users of the tenant.

Thus, by use of the method 700, a request to share an application defined by a template file on a first layer results in all user devices associated with user identifiers of the same tenant being given access to the application. In this way, a user shares access to an application without physically duplicating the data for the application or its template, reducing storage space usage and processor usage.

Figure 8:
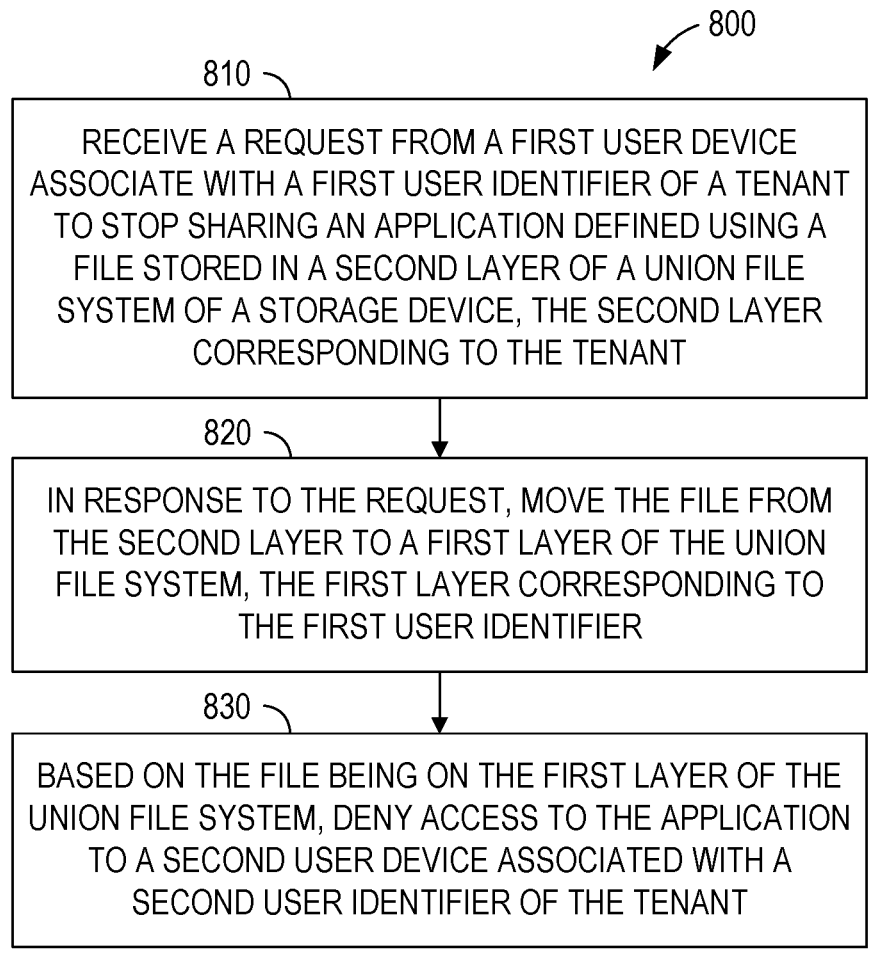
FIG. 8 is a flowchart illustrating operations of a method suitable for manipulating a tenant layer of a union file system, according to some example embodiments, according to some example embodiments.

FIG. 8 is a flowchart illustrating operations of a method 800 suitable for manipulating a tenant layer of a union file system, according to some example embodiments, according to some example embodiments. The method 800 includes operations 810, 820, and 830. By way of example and not limitation, the method 800 is described as being performed by the devices, modules, and databases of FIGS. 1-6.

Thereafter, the layer module 230 receives, from a first user device associated with a first user identifier of a tenant, a request to stop sharing an application defined using a file stored in a second layer of a union file system, the second layer corresponding to the tenant (see operation 810). As an example, the user with user layer 510B submits, from the device 140A associated with the first user identifier and via the network 150, a request to stop sharing an application defined by a template file.

In operation 820, in response to the first request, the layer module 230 moves the file from the second layer to a first layer of the union file system, the first layer corresponding to the first user identifier. For example, the application template file is moved from the tenant layer 520B to the user layer 510B. In some example embodiments, moving the template file is accomplished by updating the layer identifier for the file in the template table 350. Thus, moving the file from one layer to another may be accomplished without copying the data of the file.

The strategy module 240, based on the file being on the first layer of the union file system, denies access to the application to a second user device associated with a second user identifier of the tenant (operation 830). For example, the logical file systems 460B and 460C of FIG. 4 both have access to applications defined by template files stored on tenant layer 420B, but each of the two logical file systems has access to only one of the user layers 410A-410E. By moving the application template file from the tenant layer 420B to the user layer 410B, the union file system generates logical file systems that include access to the application for only the first user of the tenant and denies access to all other users.

Thus, by use of the method 800, a request by a first user to stop sharing an application defined by a template file on a second layer results in all other user devices associated with user identifiers of the same tenant no longer being given access to the application. In this way, a user denies access to an application without physically moving or deleting the data for the application or its template, reducing processor usage and the risk of losing data.

Examples

Example 1. A method comprising:
receiving, via a network, a first request from a first user device associated with a first user identifier of a tenant to share an application defined using a file stored in a first layer of a union file system of a storage device, the first layer corresponding to the first user identifier;
in response to the request, moving, by one or more hardware processors, the file from the first layer to a second layer of the union file system of the storage device, the second layer corresponding to the tenant; and
based on the file being on the second layer of the union file system, providing access to the application to a second user device associated with a second user identifier of the tenant.

Example 2. The method of example 1, wherein the first user identifier has read-write access to the first layer and read-only access to a third layer of the union file system.

Example 3. The method of example 2, wherein the third layer is below the second layer and the second layer is below the first layer.

Example 4. The method of any of examples 1 to 3, wherein the second layer is unavailable to a third user identifier of a second tenant.

Example 5. The method of any of examples 1 to 4, wherein the first layer is unavailable to the second user identifier.

Example 6. The method of any of examples 1 to 5, further comprising:
receiving a third request from the first user device associated with the first user identifier to stop sharing the application; and
in response to the third request, moving the file from the second layer to the first layer.

Example 7. The method of example 6, further comprising:
determining a set of applications available to the second user identifier by accessing a corresponding set of application template files in a directory, the set of applications comprising the shared application; and
wherein the moving of the file from the first layer to the second layer comprises moving the file to the directory on the second layer.

Example 8. A system comprising:
a memory that stores instructions; and
one or more processors configured by the instructions to perform operations comprising:
receiving a first request from a first user device associated with a first user identifier of a tenant to share an application defined using a file stored in a first layer of a union file system of a storage device, the first layer corresponding to the first user identifier;
in response to the request, moving the file from the first layer to a second layer of the union file system of the storage device, the second layer corresponding to the tenant; and
based on the file being on the second layer of the union file system, providing access to the application to a second user device associated with a second user identifier of the tenant.

Example 9. The system of example 8, wherein the first user identifier has read-write access to the first layer and read-only access to a third layer of the union file system.

Example 10. The system of example 9, wherein the third layer is below the second layer and the second layer is below the first layer.

Example 11. The system of any of examples 8 to 10, wherein the second layer is unavailable to a third user identifier of a second tenant.

Example 12. The system of any of examples 8 to 11, wherein the first layer is unavailable to the second user identifier.

Example 13. The system of any of examples 8 to 12, wherein the operations further comprise:
receiving a third request from the first user device associated with the first user identifier to stop sharing the application; and
in response to the third request, moving the file from the second layer to the first layer.

Example 14. The system of any of examples 8 to 13, wherein:
the operations further comprise:
determining a set of applications available to the second user identifier by accessing a corresponding set of application template files in a directory, the set of applications comprising the shared application; and the moving of the file from the first layer to the second layer comprises moving the file to the directory on the second layer.

Example 15. A non-transitory computer-readable medium that stores instructions that, when executed by one or more processors, cause the one or more processors to perform operations comprising:

receiving a first request from a first user device associated with a first user identifier of a tenant to share an application defined using a file stored in a first layer of a union file system of a storage device, the first layer corresponding to the first user identifier;

in response to the request, moving the file from the first layer to a second layer of the union file system, the second layer corresponding to the tenant; and based on the file being on the second layer of the union file system, providing access to the application to a second user device associated with a second user identifier of the tenant.

Example 16. The computer-readable medium of example 15, wherein the first user identifier has read-write access to the first layer and read-only access to a third layer of the union file system.

Example 17. The computer-readable medium of example 16, wherein the third layer is below the second layer and the second layer is below the first layer.

Example 18. The computer-readable medium of any of examples 15 to 17, wherein the second layer is unavailable to a third user identifier of a second tenant.

Example 19. The computer-readable medium of any of examples 15 to 18, wherein the first layer is unavailable to the second user identifier.

Example 20. The computer-readable medium of any of examples 15 to 19, wherein the operations further comprise:

receiving a third request from the first user device associated with the first user identifier to stop sharing the application; and in response to the third request, moving the file from the second layer to the first layer.

Figure 9:
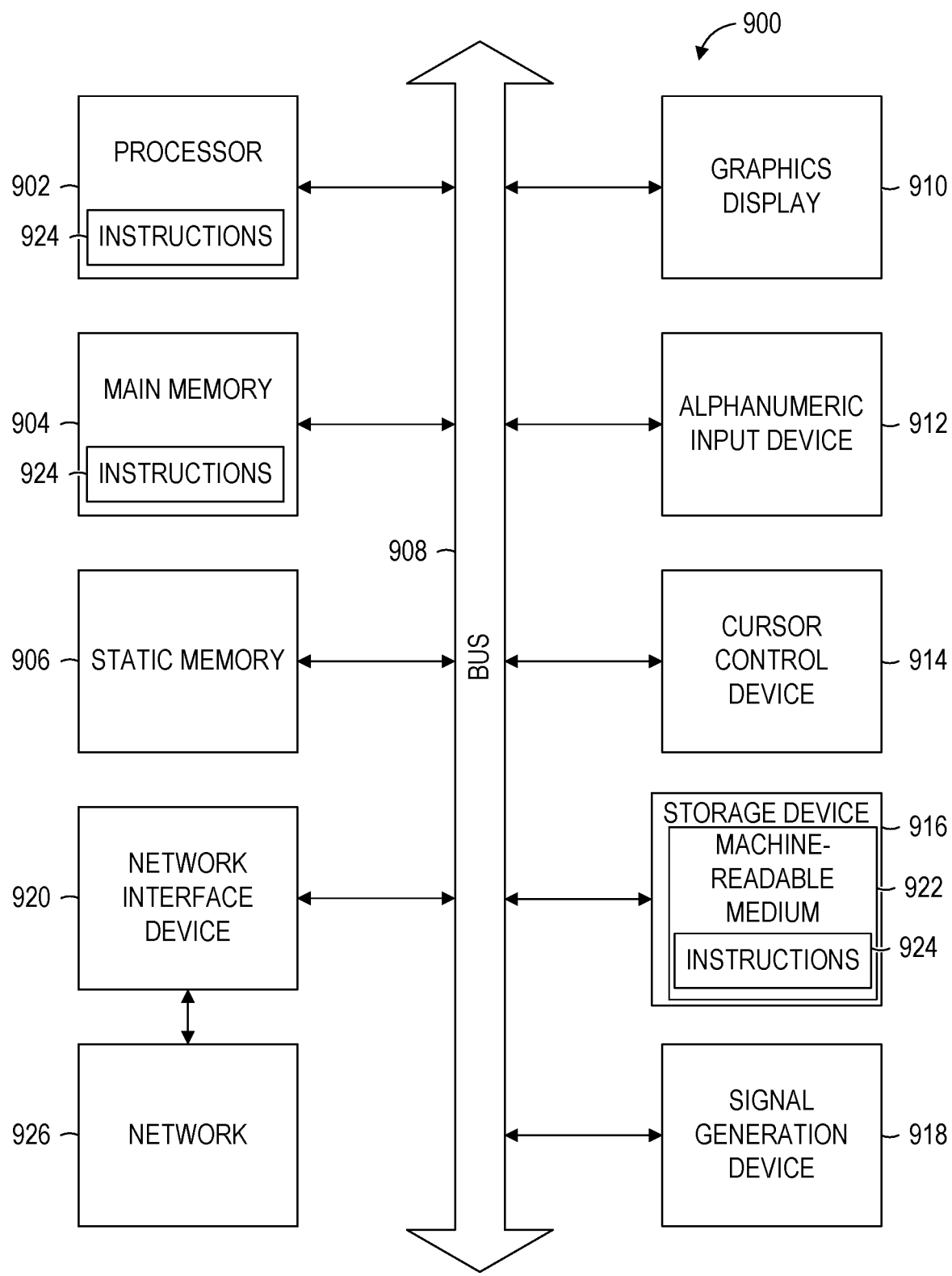
FIG. 9 is a block diagram illustrating components of a machine, according to some example embodiments.

FIG. 9 is a block diagram illustrating components of a machine 900, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 9 shows a diagrammatic representation of the machine 900 in the example form of a computer system within which instructions 924 (e.g., software, a program, an application, an applet, an app, or other executable code) for causing the machine 900 to perform any one or more of the methodologies discussed herein may be executed, in whole or in part. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light-emitting diode (LED) display, a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or another pointing instrument), a storage device 916, a signal generation device 918 (e.g., a speaker), and a network interface device 920.

The storage device 916 includes a machine-readable medium 922 on which are stored the instructions 924 embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown, in an example embodiment, to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., the machine 900), such that the instructions, when executed by one or more processors of the machine (e.g., the processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instant in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instant of time and to constitute a different hardware module at a different instant of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
    receiving, at a multitenant application server and via a network, a first request from a first user device associated with a first user identifier of a tenant to stop sharing an application defined using a file stored in a first layer of a union file system of a storage device, the first layer corresponding to the tenant;
    in response to the first request, moving, by one or more hardware processors, the file from the first layer to a second layer of the union file system of the storage device, the second layer corresponding to the first user identifier; and
    based on the file being on the second layer of the union file system, denying access to the application to a second user device associated with a second user identifier of the tenant.

2. The method of claim 1, wherein the first user identifier has read-write access to the second layer and read-only access to a third layer of the union file system.

3. The method of claim 2, wherein the third layer is below the first layer and the first layer is below the second layer.

4. The method of claim 1, wherein the first layer is available to the second user identifier.

5. The method of claim 4, wherein based on a third user identifier being of a second tenant, the first layer is unavailable to the third user identifier.

6. The method of claim 1, further comprising:
    determining a set of applications available to the second user identifier by accessing a corresponding set of application template files in a directory on the first layer of the union file system; and
    wherein the moving of the file from the first layer to the second layer comprises moving the file from the directory on the second layer.

7. The method of claim 1, wherein the first layer is composed of a plurality of underlying layers.

8. A multitenant system comprising:
    a memory that stores instructions; and
    one or more processors configured by the instructions to perform operations comprising:
        receiving, via a network, a first request from a first user device associated with a first user identifier of a tenant to stop sharing an application defined using a file stored in a first layer of a union file system of a storage device, the first layer corresponding to the tenant;
        in response to the first request, moving the file from the first layer to a second layer of the union file system of the storage device, the second layer corresponding to the first user identifier; and
        based on the file being on the second layer of the union file system, denying access to the application to a second user device associated with a second user identifier of the tenant.

9. The multitenant system of claim 8, wherein the first user identifier has read-write access to the second layer and read-only access to a third layer of the union file system.

10. The multitenant system of claim 9, wherein the third layer is below the first layer and the first layer is below the second layer.

11. The multitenant system of claim 8, wherein the first layer is available to the second user identifier.

12. The multitenant system of claim 11, wherein based on a third user identifier being of a second tenant, the first layer is unavailable to the third user identifier.

13. The multitenant system of claim 8, wherein the operations further comprise:
    determining a set of applications available to the second user identifier by accessing a corresponding set of application template files in a directory on the first layer of the union file system; and
    wherein the moving of the file from the first layer to the second layer comprises moving the file from the directory on the second layer.

14. The multitenant system of claim 8, wherein the first layer is composed of a plurality of underlying layers.

15. A non-transitory computer-readable medium that stores instructions that, when executed by one or more processors of a multitenant application server, cause the multitenant application server to perform operations comprising:
    receiving, via a network, a first request from a first user device associated with a first user identifier of a tenant to stop sharing an application defined using a file stored in a first layer of a union file system of a storage device, the first layer corresponding to the tenant;
    in response to the first request, moving the file from the first layer to a second layer of the union file system of the storage device, the second layer corresponding to the first user identifier; and
    based on the file being on the second layer of the union file system, denying access to the application to a second user device associated with a second user identifier of the tenant.

16. The non-transitory computer-readable medium of claim 15, wherein the first user identifier has read-write access to the second layer and read-only access to a third layer of the union file system.

17. The non-transitory computer-readable medium of claim 16, wherein the third layer is below the first layer and the first layer is below the second layer.

18. The non-transitory computer-readable medium of claim 15, wherein the first layer is available to the second user identifier.

19. The non-transitory computer-readable medium of claim 18, wherein based on a third user identifier being of a second tenant, the first layer is unavailable to the third user identifier.

20. The non-transitory computer-readable medium of claim 15, wherein the operations further comprise:
    determining a set of applications available to the second user identifier by accessing a corresponding set of application template files in a directory on the first layer of the union file system; and
    wherein the moving of the file from the first layer to the second layer comprises moving the file from the directory on the second layer.

* * * * *